(12) United States Patent
Serna et al.

(10) Patent No.: US 11,392,375 B1
(45) Date of Patent: Jul. 19, 2022

(54) OPTIMIZING SOFTWARE CODEBASES USING ADVANCED CODE COMPLEXITY METRICS

(71) Applicant: Bank of America Corporation, Charlotte, NC (US)

(72) Inventors: Daniel Joseph Serna, The Colony, TX (US); Patrick N. Lawrence, Pensacola, FL (US); Christopher Danielson, Poway, CA (US); Marcus Raphael Matos, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/179,044

(22) Filed: Feb. 18, 2021

(51) Int. Cl.
*G06F 8/77* (2018.01)
*G06N 20/00* (2019.01)
*G06F 8/75* (2018.01)
*G06F 8/71* (2018.01)

(52) U.S. Cl.
CPC .................. *G06F 8/77* (2013.01); *G06F 8/71* (2013.01); *G06F 8/75* (2013.01); *G06N 20/00* (2019.01)

(58) Field of Classification Search
USPC ........................................................ 717/101
See application file for complete search history.

(56) References Cited

U.S. PATENT DOCUMENTS 6,347,398 B1    2/2002   Parthasarathy et al.
9,268,665 B2    2/2016   Barrow et al.
2005/0033624 A1  2/2005   Dixon
2007/0220486 A1  9/2007   Lammel et al.
2008/0209230 A1  8/2008   Verma et al.
2011/0022551 A1  1/2011   Dixon
2011/0066558 A1  3/2011   Bassin et al.
2011/0067009 A1  3/2011   Hosokawa et al.
2013/0311968 A1  11/2013  Sharma
2013/0311975 A1  11/2013  Supplisson et al.
2014/0123110 A1  5/2014   Wan et al.
2016/0077829 A1  3/2016   Lake
(Continued)

OTHER PUBLICATIONS

Bang et al., Automatically Computing Path complexity of Programs, 2015, ACM, p. 61-72 (Year: 2015).*
(Continued)

*Primary Examiner* — John Q Chavis
(74) *Attorney, Agent, or Firm* — Banner & Witcoff, Ltd.

(57) ABSTRACT

Aspects of the disclosure relate to codebase effort tracking. A computing platform may detect accessing of a first code resource by a user of a computing device and initiate tracking of a first interaction time associated with the first code resource. Subsequently, the computing platform may detect loss of interaction with the first code resource and terminate tracking of the first interaction time. Then, the computing platform may detect accessing of a second code resource by the user of the computing device and initiate tracking of a second interaction time associated with the second code resource. Based on the tracking of the respective interaction times, the computing platform may generate and store a code complexity metric. Then, the computing platform may repeat one or more steps for a third code resource and update the code complexity metric based on a third interaction time associated with the third code resource.

20 Claims, 10 Drawing Sheets (56) References Cited

U.S. PATENT DOCUMENTS

| | | | |
|---|---|---|---|
| 2017/0031800 A1 | 2/2017 | Shani et al. |
| 2017/0060578 A1 | 3/2017 | Shukla et al. |
| 2018/0004488 A1 | 1/2018 | Dunne et al. |
| 2018/0157845 A1 | 6/2018 | Mehta |
| 2018/0373507 A1 | 12/2018 | Mizrahi et al. |
| 2019/0347093 A1 | 11/2019 | Challagolla et al. |
| 2019/0347095 A1 | 11/2019 | Adams et al. |
| 2020/0225943 A1 | 7/2020 | van Schaik |
| 2020/0226055 A1 | 7/2020 | Lavigne et al. |
| 2020/0234346 A1 | 7/2020 | Venkateswaran et al. |
| 2020/0249941 A1 | 8/2020 | Tornhill |
| 2020/0250070 A1 | 8/2020 | Willson et al. |

OTHER PUBLICATIONS

Sarwar et al., Cyclomatic Complexity for WCF . . . , 2012, IEEE, p. 175-180 (Year: 2012).*
Dietrich, E., "Keep Your Codebase Fit with Trend Metrics." Blog, Sep. 1, 2016, NDepend, retrieved Feb. 11, 2021 from https://blog.ndepend.com/codebase-fit-trend-metrics/.

* cited by examiner

User Interface
*User Computing Device*

Using a scale of 0-5, 0=Not at all Distracted and 5=Very Distracted, how would you rate your productivity today?

0   1   2   3   4   5
Not at all                Very
Distracted              Distracted Enter additional details ...

Help | More Options ...

Close

FIG. 4

User Interface
Management Computing Device

Welcome to your Reporting Dashboard. Here you may view:

Project Management Recommendations ...

Identified Training Opportunities ...

Identified Skillset Mismatches ...

Help | More Options ...

Close

OPTIMIZING SOFTWARE CODEBASES USING ADVANCED CODE COMPLEXITY METRICS

BACKGROUND

Aspects of the disclosure relate to computer software development. In particular, one or more aspects of the disclosure relate to determining code or application complexity, for example, by tracking software development efforts and productivity.

Traditional metrics such as cyclomatic complexity are often used to estimate code complexity. Cyclomatic complexity may provide a quantitative measure of the number of linearly independent paths through code, but fails to provide a full picture of which areas of a codebase are consuming inordinate amounts of developer time. For example, code that includes many logic paths might have high cyclomatic complexity, but the code in each logic path might be relatively straightforward. Conversely, code that includes few logic paths might have low cyclomatic complexity, but the code in each logic path might still be very complex. In many instances, for example, poor naming conventions, poorly organized code, or novel code may cause developers to spend unbalanced amounts of times in certain areas of a codebase. Therefore, it may be difficult to use traditional metrics to gauge allocation of resources, plan project timelines, and identify areas of a codebase for optimization.

SUMMARY

Aspects of the disclosure provide effective, efficient, scalable, and convenient technical solutions that address and overcome the technical problems associated with determining code complexity. In particular, one or more aspects of the disclosure provide techniques for codebase effort tracking. Some aspects of the disclosure provide insight into code complexity based on how time is spent (e.g., by developers) in a codebase during development. Additional aspects of the disclosure may provide reports or notifications for a comprehensive and accurate understanding of code complexity for a software development project. Additional aspects of the disclosure may provide techniques for efficient allocation of resources, accurate planning of project timelines, and quick identification of areas of a codebase for optimization or remediation (e.g., responding to regulatory requirements or security events).

In accordance with one or more embodiments, a computing platform having at least one processor, a communication interface, and memory may detect accessing of a first code resource of a codebase by a user of a computing device. Responsive to detecting the accessing of the first code resource, the computing platform may initiate tracking of a first interaction time indicative of a time of an interaction by the user of the computing device with the first code resource. Next, the computing platform may detect loss of the interaction by the user of the computing device with the first code resource. Responsive to detecting the loss of the interaction with the first code resource, the computing platform may terminate tracking of the first interaction time associated with the first code resource. Then, the computing platform may detect accessing of a second code resource of the codebase by the user of the computing device. Responsive to detecting the accessing of the second code resource, the computing platform may initiate tracking of a second interaction time indicative of a time of an interaction by the user of the computing device with the second code resource. Based on the tracking of the first interaction time and the second interaction time, the computing platform may generate a code complexity metric indicative of a complexity of the codebase. Then, the computing platform may store the code complexity metric in at least one database.

In some embodiments, the computing platform may detect loss of the interaction by the user of the computing device with the second code resource and, responsive to detecting the loss of the interaction with the second code resource, terminate tracking of the second interaction time associated with the second code resource.

In some embodiments, the computing platform may detect accessing of a third code resource of the codebase by the user of the computing device, responsive to detecting the accessing of the third code resource, initiate tracking of a third interaction time indicative of a time of an interaction by the user of the computing device with the third code resource, and update the code complexity metric based on the third interaction time associated with the third code resource.

In some embodiments, the first code resource, the second code resource, and the third code resource may include different code resources.

In some embodiments, detecting accessing of a respective code resource may include detecting accessing of a file, a class, or a function.

In some embodiments, detecting loss of an interaction with a respective code resource may include detecting an expiration of a predetermined duration of time after which accessing of the respective code resource is detected.

In some embodiments, the computing platform may associate the code complexity metric with user identification information, associate the code complexity metric with timestamp information, and normalize the code complexity metric based on the user identification information or the timestamp information.

In some embodiments, the computing platform may determine that the user of the computing device is interacting with a respective code resource based on tracking a cursor on a viewport of the computing device, tracking a keyboard input on the viewport of the computing device, tracking facial movements of the user of the computing device, or tracking processor activity on the computing device.

In some embodiments, the computing platform may apply a machine learning algorithm to the code complexity metric to identify one or more problematic areas of the codebase, and initiate remedial action of the one or more problematic areas of the codebase. In some embodiments, initiating the remedial action of the one or more problematic areas of the codebase may include sending a notification of the one or more problematic areas of the codebase to a management computing device. In some embodiments, applying the machine learning algorithm to the code complexity metric to identify the one or more problematic areas of the codebase may include identifying a technical debt area of the codebase or a resource constrained area of the codebase.

In some embodiments, the computing platform may apply an unsupervised clustering algorithm to the code complexity metric to generate clusters of data associated with contributing users of the codebase, identify insight information about the contributing users of the codebase based on the generated clusters of data, and generate a report based on the insight information. In some embodiments, identifying the insight information may include identifying training opportunities for the contributing users of the codebase or skillset mismatches associated with tasks assigned to the contributing users of the codebase.

In some embodiments, the computing platform may prompt the user of the computing device to provide productivity information indicating a level of productivity of the user of the computing device during a predetermined period of time, and normalize the code complexity metric based on the productivity information provided by the user of the computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
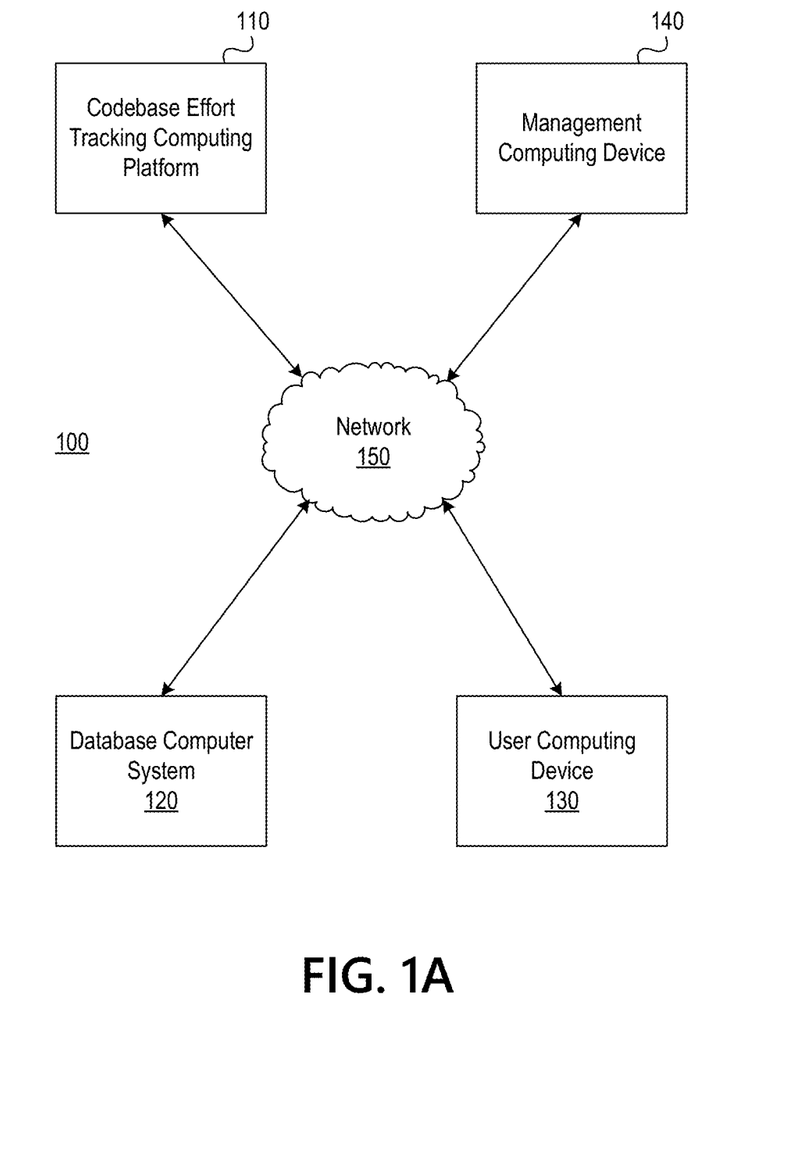
FIGS. 1A and 1B depict an illustrative computing environment for codebase effort tracking in accordance with one or more example embodiments.
Figure 1B:
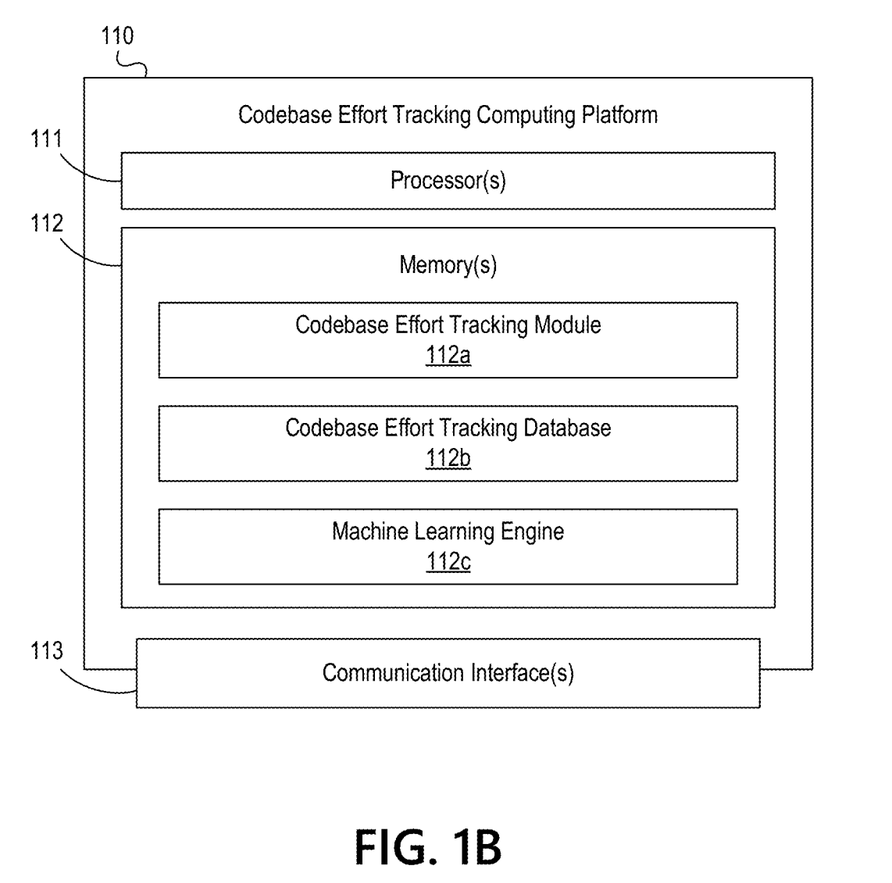

FIGS. 1A and 1B depict an illustrative computing environment for codebase effort tracking in accordance with one or more example embodiments. Referring to FIG. 1A, computing environment 100 may include one or more computing devices and/or other computing systems. For example, computing environment 100 may include codebase effort tracking computing platform 110, database computer system 120, user computing device 130, and management computing device 140. Although one user computing device 130 is shown for illustrative purposes, any number of user computing devices may be used without departing from the disclosure. In addition, although one management computing device 140 is shown for illustrative purposes, any number of management computing devices may be used without departing from the disclosure.

As illustrated in greater detail below, codebase effort tracking computing platform 110 may include one or more computing devices configured to perform one or more of the functions described herein. For example, codebase effort tracking computing platform 110 may include one or more computers (e.g., laptop computers, desktop computers, servers, server blades, or the like).

Database computer system 120 may include different information storage entities storing code and/or code resource information (e.g., file, class, or function information), user identification information (e.g., a user ID), timestamp or other time information (e.g., a data collection time, or an amount of time spent interacting with a code resource), user productivity information (e.g., user-provided distraction response information), and/or other information associated with code complexity determinations.

User computing device 130 may include one or more computing devices and/or other computer components (e.g., processors, memories, communication interfaces). For instance, user computing device 130 may be a server, desktop computer, laptop computer, tablet, mobile device, or the like, and may be used by a software developer, or the like. In addition, user computing device 130 may be associated with an enterprise organization operating codebase effort tracking computing platform 110.

Management computing device 140 may include one or more computing devices and/or other computer components (e.g., processors, memories, communication interfaces). For instance, management computing device 140 may be a server, desktop computer, laptop computer, tablet, mobile device, or the like, and may be used by a software development manager, human resources manager, training partner, or the like. In addition, management computing device 140 may be associated with an enterprise organization operating codebase effort tracking computing platform 110.

Computing environment 100 also may include one or more networks, which may interconnect one or more of codebase effort tracking computing platform 110, database computer system 120, user computing device 130, and management computing device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, codebase effort tracking computing platform 110, database computer system 120, user computing device 130, and management computing device 140 may be associated with an organization (e.g., a financial institution), and network 150 may be associated with and/or operated by the organization, and may include one or more networks (e.g., LANs, WANs, virtual private networks (VPNs), or the like) that interconnect codebase effort tracking computing platform 110, database computer system 120, user computing device 130, management computing device 140. Network 150 also may include a public sub-network that may connect the private sub-network and/or one or more computing devices connected thereto (e.g., codebase effort tracking computing platform 110, database computer system 120, user computing device 130, and management computing device 140) with one or more networks and/or computing devices that are not associated with the organization.

In one or more arrangements, codebase effort tracking computing platform 110, database computer system 120, user computing device 130, and management computing device 140 may be any type of computing device capable of receiving a user interface, receiving input via the user interface, and communicating the received input to one or more other computing devices. For example, codebase effort tracking computing platform 110, database computer system 120, user computing device 130, management computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, codebase effort tracking computing platform 110 may include one or more processor(s) 111, memory(s) 112, and communication interface(s) 113. A data bus may interconnect processor 111, memory 112, and communication interface 113. Communication interface 113 may be a network interface configured to support communication between codebase effort tracking computing platform 110 and one or more networks (e.g., network 150 or the like). Memory 112 may include one or more program modules having instructions that when executed by processor 111 cause codebase effort tracking computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of codebase effort tracking computing platform 110 and/or by different computing devices that may form and/or otherwise make up codebase effort tracking computing platform 110. For example, memory 112 may have, store, and/or include a codebase effort tracking module 112*a*, a codebase effort tracking database 112*b*, and a machine learning engine 112*c*. Codebase effort tracking module 112*a* may have instructions that direct and/or cause codebase effort tracking computing platform 110 to, for instance, intelligently monitor or track how developers spend their time in a codebase and generate insight into code complexity, as discussed in greater detail below. Codebase effort tracking database 112*b* may store information used by codebase effort tracking module 112*a* and/or codebase effort tracking computing platform 110 in intelligently monitoring or tracking how developers spend their time in a codebase, generating insight into code complexity, and/or in performing other functions, as discussed in greater detail below. Machine learning engine 112*c* may have instructions that direct and/or cause codebase effort tracking computing platform 110 to set, define, and/or iteratively redefine rules, techniques and/or other parameters used by codebase effort tracking computing platform 110 and/or other systems in computing environment 100 in generating insight into code complexity.

FIGS. 2A-2E depict an illustrative event sequence for codebase effort tracking in accordance with one or more example embodiments. FIG. 3 depicts an illustrative time tracking flowchart for codebase effort tracking in accordance with one or more example embodiments. For purposes of illustration, FIGS. 2A-2E and FIG. 3 will be discussed together.

Figure 2A:
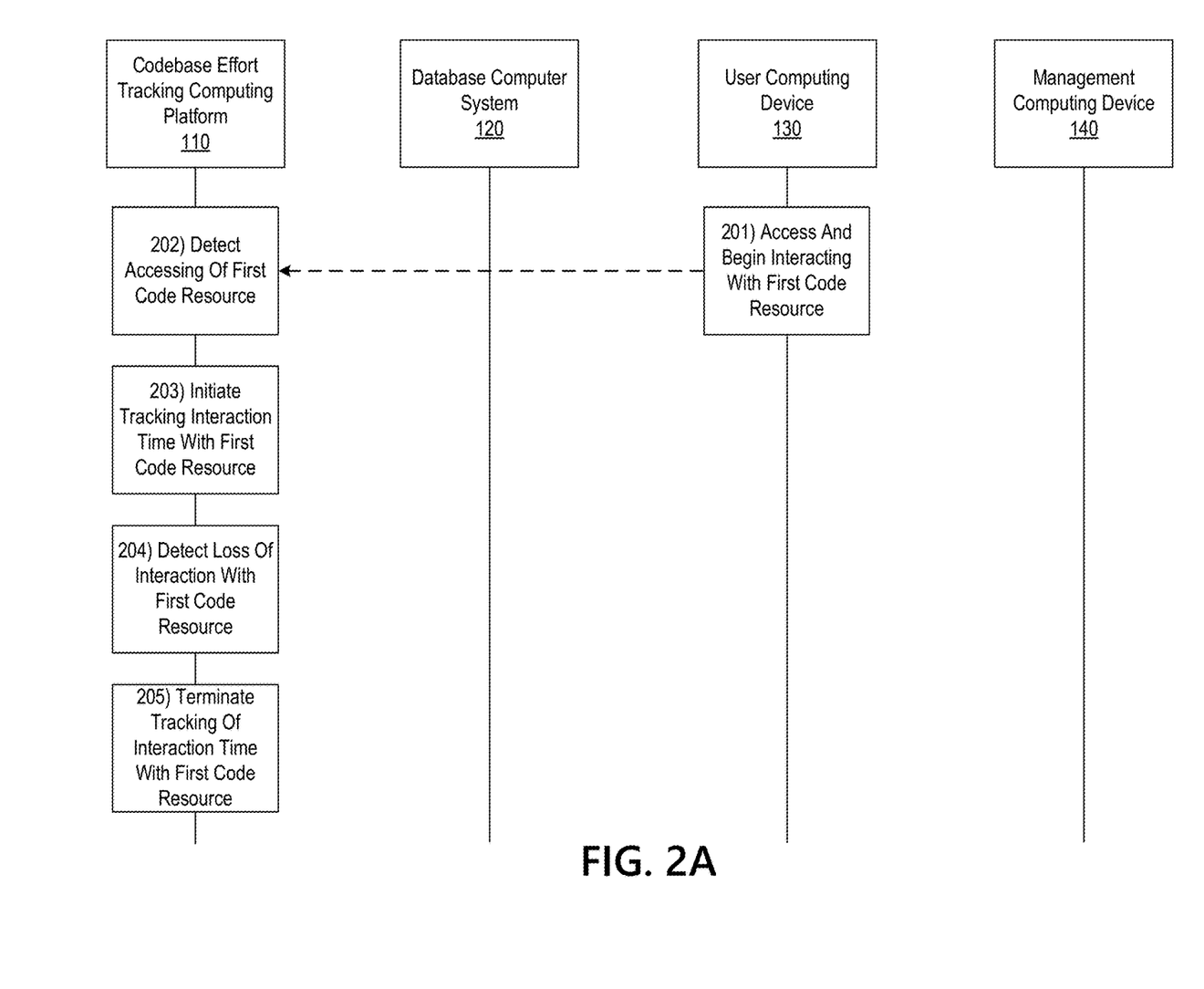
FIGS. 2A-2E depict an illustrative event sequence for codebase effort tracking in accordance with one or more example embodiments.
Figure 3:
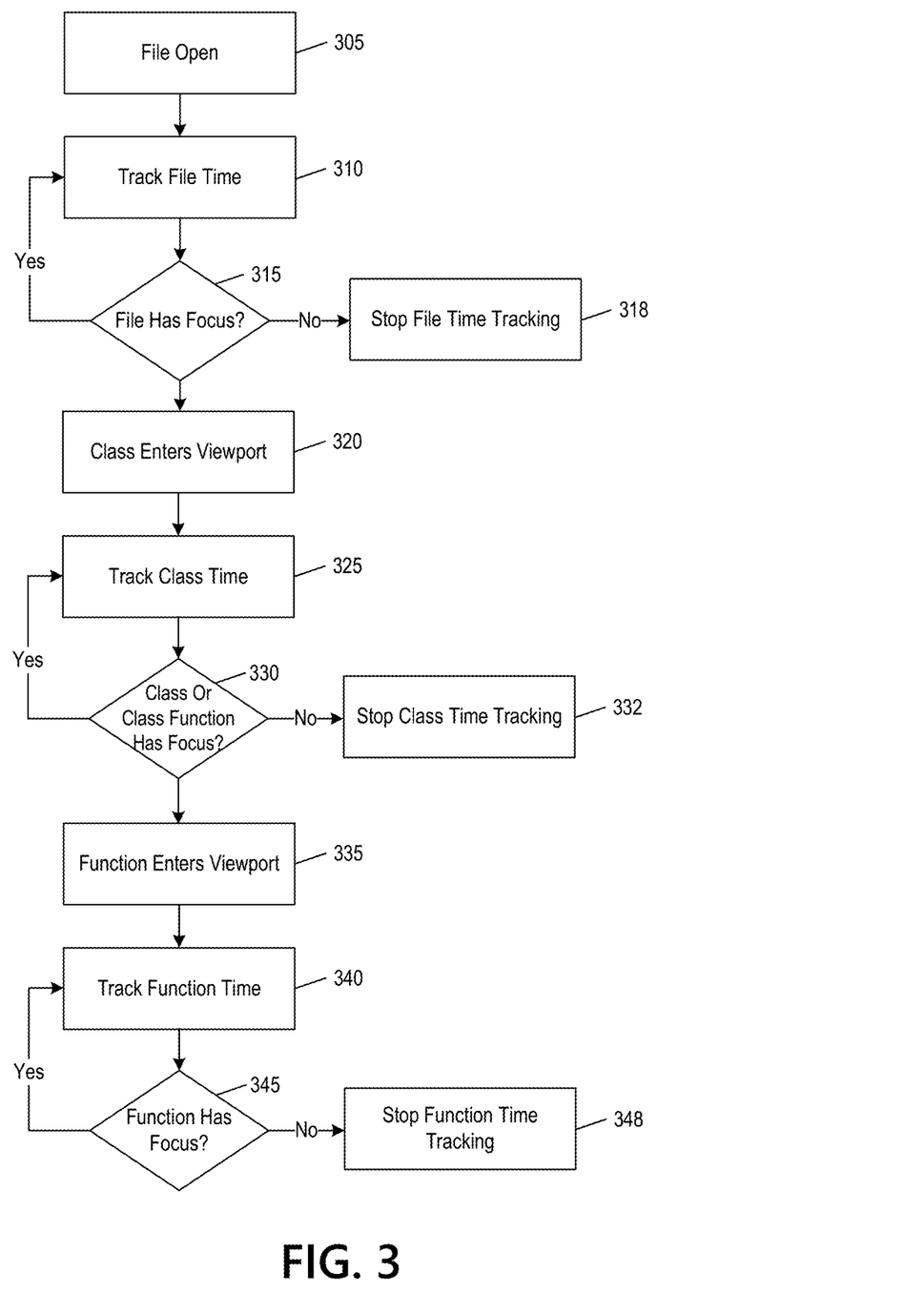
FIG. 3 depicts an illustrative flowchart for codebase effort tracking in accordance with one or more example embodiments.

Referring to FIG. 2A, at step 201, a user of a computing device (e.g., user computing device 130), may access and begin interacting with a first code resource of a codebase. For example, the first code resource may be a file in the codebase. At step 202, codebase effort tracking computing platform 110 may detect the accessing of the first code resource by the user of the computing device (e.g., user computing device 130).

At step 203, codebase effort tracking computing platform 110 may initiate tracking of a first interaction time associated with the first code resource. In initiating tracking of the first interaction time associated with the first code resource, codebase effort tracking computing platform 110 may utilize one or more time tracking tools or applications (e.g., one or more timers installed on a user computing device). The first interaction time may be indicative of an amount of time spent by the user of the computing device (e.g., user computing device 130) interacting with the first code resource. In some examples, codebase effort tracking computing platform 110 may determine that the user of the computing device (e.g., user computing device 130) is interacting with (e.g., actively focusing on or working on) the first code resource based on tracking a cursor (e.g., a mouse cursor) on a viewport of the computing device, tracking a keyboard input on the viewport of the computing device, tracking facial or body movements of the user of the computing device (e.g., using eye detection or motion detection), or tracking processor activity on the computing device (e.g., CPU process inspection).

At step 204, codebase effort tracking computing platform 110 may detect loss of the interaction by the user of the computing device (e.g., user computing device 130) with the first code resource. At step 205, responsive to detecting the loss of interaction with the first code resource, codebase effort tracking computing platform 110 may terminate tracking of the first interaction time associated with the first code resource. In some examples, detecting loss of the interaction with the first code resource may include detecting an expiration of a predetermined duration of time (e.g., a time window or threshold), such as a predetermined number of minutes, or other time measurement, after which accessing of the first code resource is detected (e.g., at step 202).

By way of non-limiting example, referring to FIG. 3, at step 305, codebase effort tracking computing platform 110 may detect when the file is opened, and at step 310, begin tracking the time spent while the file is in active focus (e.g., file time tracking). At step 315, codebase effort tracking computing platform 110 may continue tracking the time spent in the file as long as the user of the computing device (e.g., user computing device 130) continues to interact with the file (e.g., the user or developer is actively focusing on the file, or the file remains viewable within a window of a development environment). At step 318, when the user of the computing device (e.g., user computing device 130), stops interacting with the file (e.g., the user or developer is no longer actively focusing on the file, or the file is no longer viewable within a window of a development environment), codebase effort tracking computing platform 110 may stop tracking the time spent in the file. For example, the user or developer may have switched to another file or to another program completely.

Figure 2B:
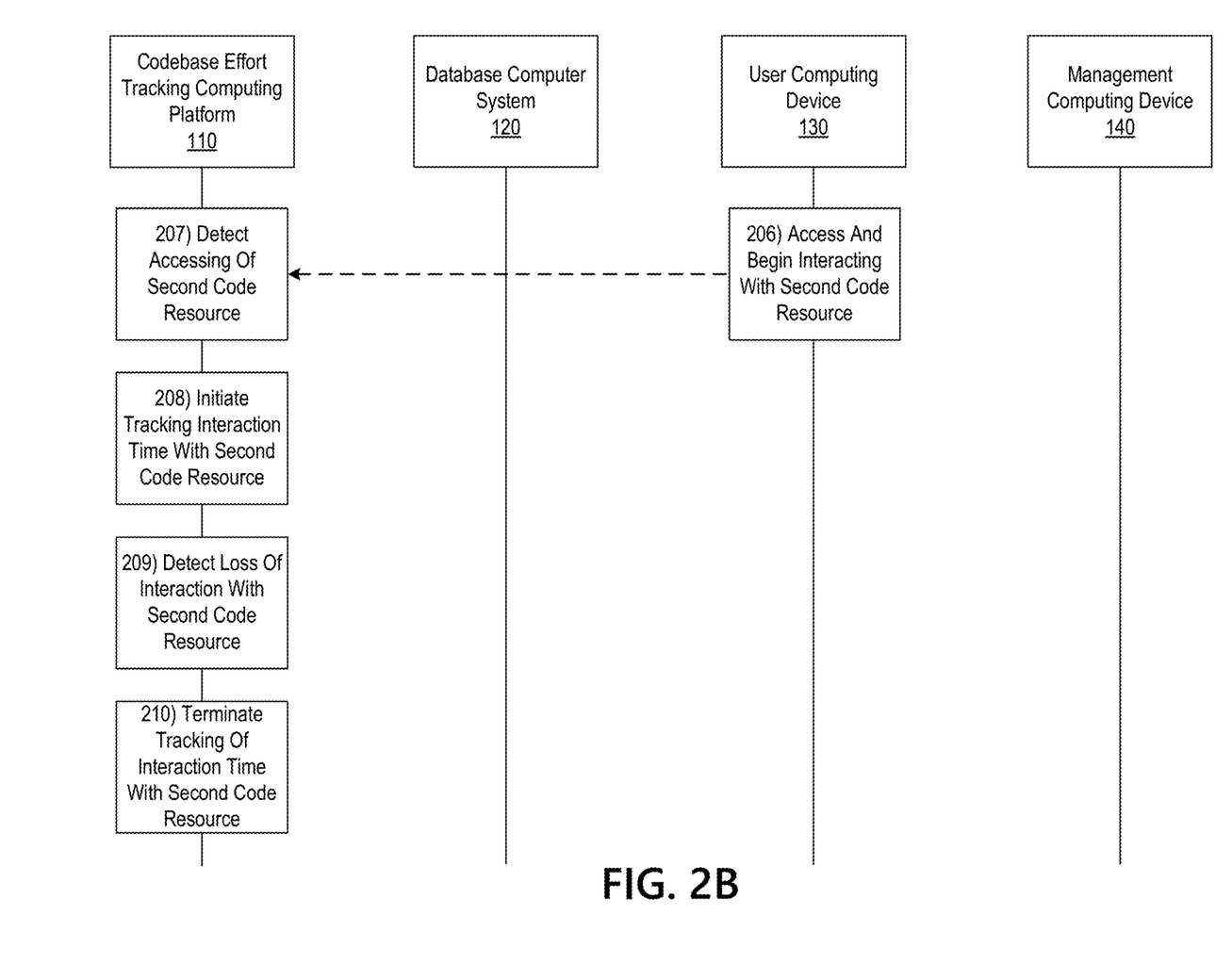

Referring to FIG. 2B, at step 206, the user of the computing device (e.g., user computing device 130), may access and begin interacting with a second code resource of a codebase. For example, the second code resource may be a class (e.g., a class within a file). At step 207, codebase effort tracking computing platform 110 may detect the accessing of the second code resource by the user of the computing device (e.g., user computing device 130).

At step 208, codebase effort tracking computing platform 110 may initiate tracking of a second interaction time associated with the second code resource. In initiating tracking of the second interaction time associated with the first code resource, codebase effort tracking computing platform 110 may utilize one or more time tracking tools or applications (e.g., one or more timers installed on a user computing device). The second interaction time may be indicative of an amount of time spent by the user of the computing device (e.g., user computing device 130) interacting with the second code resource. In some examples, codebase effort tracking computing platform 110 may determine that the user of the computing device (e.g., user computing device 130) is interacting with (e.g., actively focusing on or working on) the second code resource based on tracking a cursor (e.g., a mouse cursor) on a viewport of the computing device, tracking a keyboard input on the viewport of the computing device, tracking facial or body movements of the user of the computing device (e.g., using eye detection or motion detection), or tracking processor activity on the computing device (e.g., CPU process inspection).

At step 209, codebase effort tracking computing platform 110 may detect loss of the interaction by the user of the computing device (e.g., user computing device 130) with the second code resource. At step 210, responsive to detecting the loss of interaction with the second code resource, codebase effort tracking computing platform 110 may terminate tracking of the second interaction time associated with the second code resource. In some examples, detecting loss of the interaction with the second code resource may include detecting an expiration of a predetermined duration of time (e.g., a time window or threshold), such as a predetermined number of minutes, or other time measurement, after which accessing of the second code resource is detected (e.g., at step 207).

By way of non-limiting example, referring to FIG. 3, at step 320, with a file in active focus, codebase effort tracking computing platform 110 may detect when a class enters a viewport of the computing device (e.g., user computing device 130), and at step 325, begin tracking the time spent while the class is in active focus (e.g., class time tracking). At step 330, codebase effort tracking computing platform 110 may continue tracking the time spent in the class as long as the user of the computing device (e.g., user computing device 130) continues to interact with the class (e.g., the user or developer is actively focusing on the class, or the class remains viewable within a window of a development environment). Additionally or alternatively, since a class may span several screens and potentially several files, codebase effort tracking computing platform 110 may, at step 330, continue class time tracking as long as any related class functions are visible in the viewport of the computing device (e.g., user computing device 130) and the file is in active focus at step 315. At step 332, when the user of the computing device (e.g., user computing device 130), stops interacting with the class (e.g., the user or developer is no longer actively focusing on the class and related class function(s), or the class and related class function(s) are no longer viewable within a window of a development environment), codebase effort tracking computing platform 110 may stop tracking the time spent in the class.

Figure 2C:
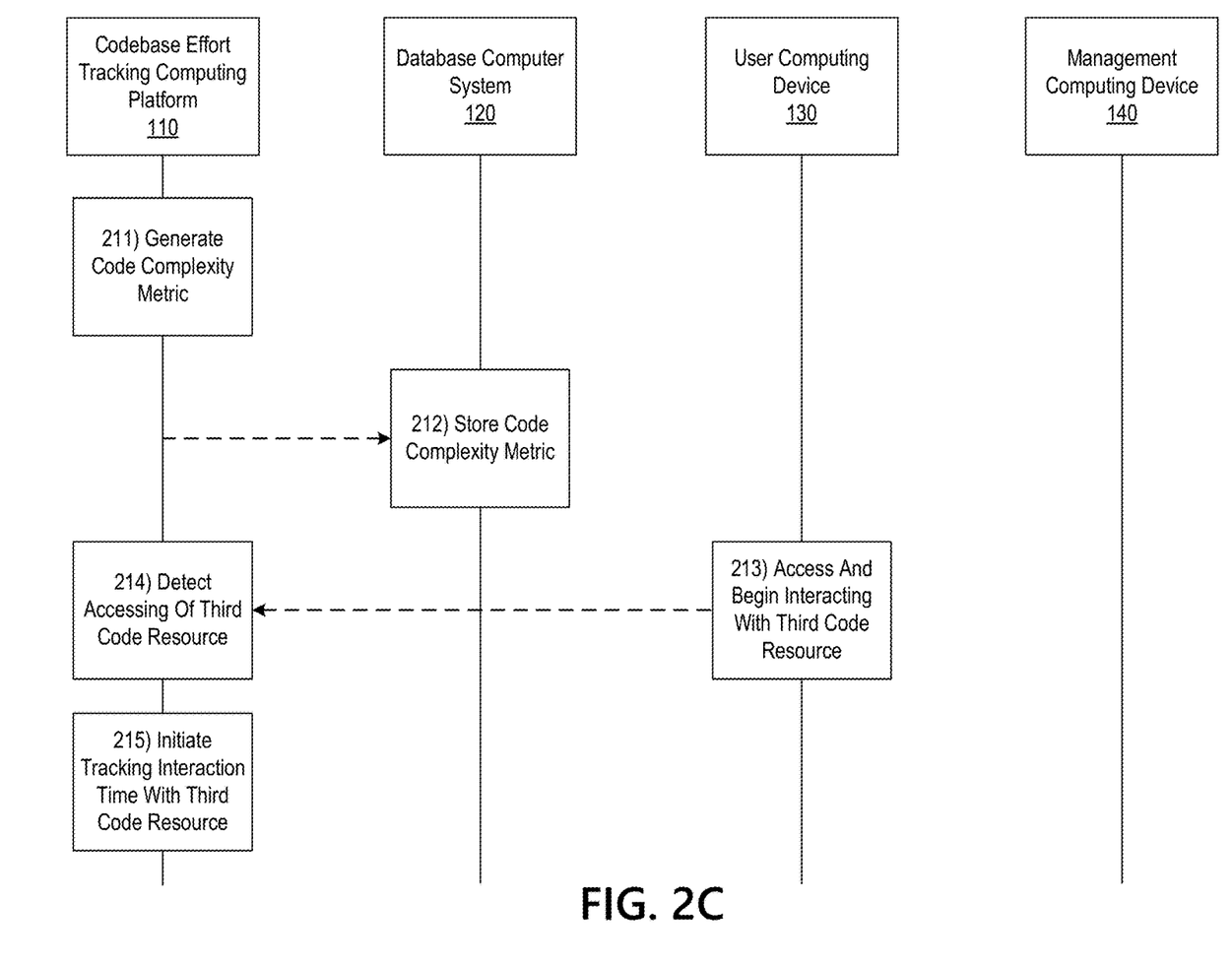

Referring to FIG. 2C, at step 211, based on the tracking of the first interaction time associated with the first code resource and the second interaction time associated with the second code resource, codebase effort tracking computing platform 110 may generate a code complexity metric indicative of a complexity of the codebase. At step 212, codebase effort tracking computing platform 110 may store the code complexity metric in at least one database (e.g., database computer system 120), which may be maintained by the computing platform or any of the devices described herein.

Subsequently, codebase effort tracking computing platform 110 repeat one or more steps of the example event sequence discussed above (e.g., for additional or different code resources, such as modules or methods within a codebase) in determining code complexity more accurately and consistently. For example, at step 213, a user of a computing device (e.g., user computing device 130), may access and begin interacting with a third code resource of a codebase. For example, the third code resource may be a function (e.g., a function within a class). At step 214, codebase effort tracking computing platform 110 may detect the accessing of the third code resource by the user of the computing device (e.g., user computing device 130).

At step 215, codebase effort tracking computing platform 110 may initiate tracking of a third interaction time associated with the third code resource. In initiating tracking of the third interaction time associated with the first code resource, codebase effort tracking computing platform 110 may utilize one or more time tracking tools or applications (e.g., one or more timers installed on a user computing device). The third interaction time may be indicative of an amount of time spent by the user of the computing device (e.g., user computing device 130) interacting with the third code resource. In some examples, codebase effort tracking computing platform 110 may determine that the user of the computing device (e.g., user computing device 130) is interacting with (e.g., actively focusing on or working on) the third code resource based on tracking a cursor (e.g., a mouse cursor) on a viewport of the computing device, tracking a keyboard input on the viewport of the computing device, tracking facial or body movements of the user of the computing device (e.g., using eye detection or motion detection), or tracking processor activity on the computing device (e.g., CPU process inspection).

Figure 2D:
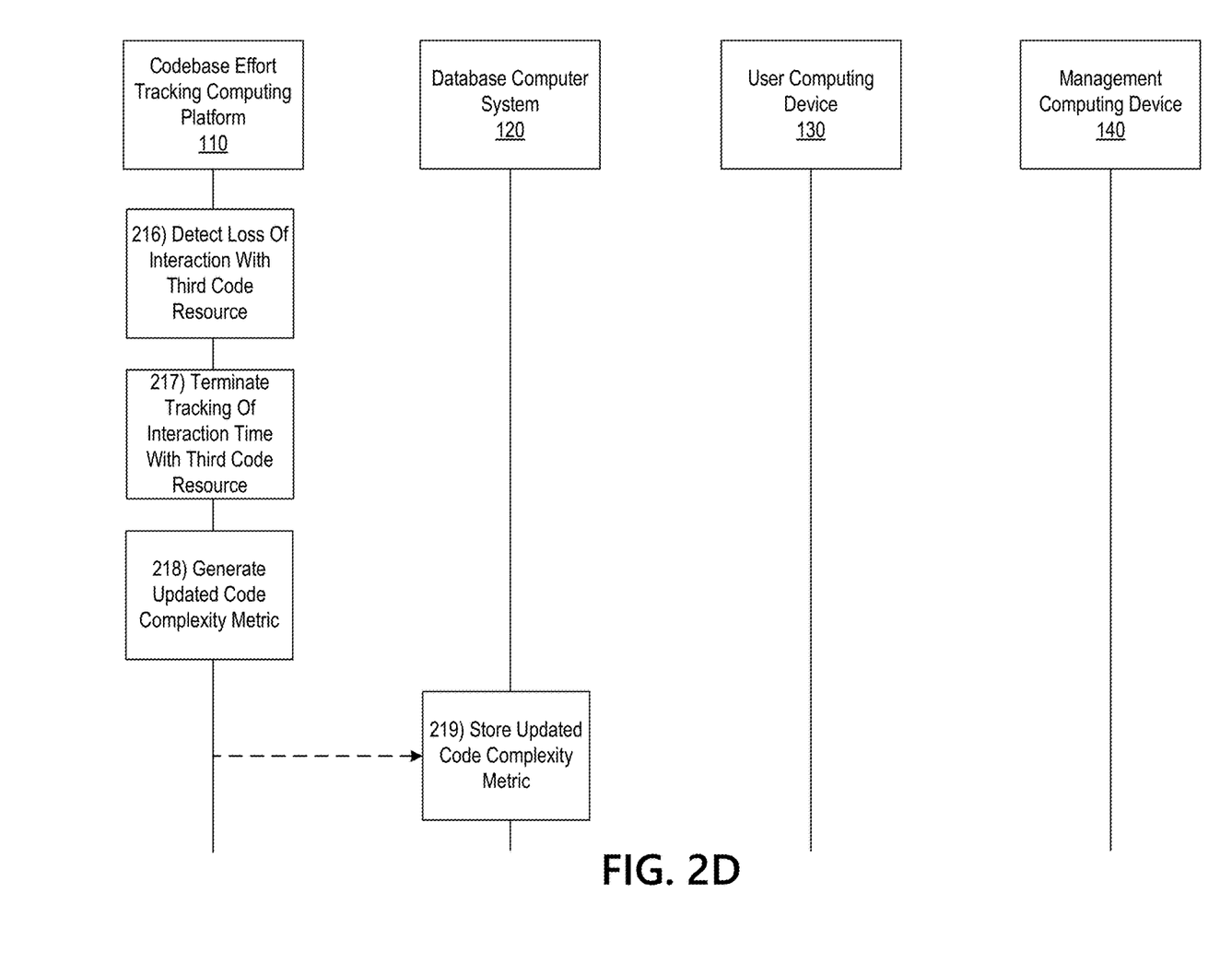

Referring to FIG. 2D, at step 216, codebase effort tracking computing platform 110 may detect loss of the interaction by the user of the computing device (e.g., user computing device 130) with the third code resource. At step 217, responsive to detecting the loss of interaction with the third code resource, codebase effort tracking computing platform 110 may terminate tracking of the third interaction time associated with the third code resource. In some examples, detecting loss of the interaction with the third code resource may include detecting an expiration of a predetermined duration of time (e.g., a time window or threshold), such as a predetermined number of minutes, or other time measurement, after which accessing of the third code resource is detected (e.g., at step 214). At step 218, codebase effort tracking computing platform 110 may update the code complexity metric based on the third interaction time associated with the third code resource. At step 219, codebase effort tracking computing platform 110 may store the updated code complexity metric in at least one database (e.g., database computer system 120), which may be maintained by the computing platform or any of the devices described herein.

By way of non-limiting example, referring to FIG. 3, at step 335, with a file and/or class in active focus, codebase effort tracking computing platform 110 may detect when a function enters a viewport of the computing device (e.g., user computing device 130), and at step 340, begin tracking the time spent while the function is in active focus (e.g., function time tracking). At step 345, codebase effort tracking computing platform 110 may continue tracking the time spent in the function as long as the user of the computing device (e.g., user computing device 130) continues to interact with the function (e.g., the user or developer is actively focusing on the function, or the function remains viewable within a window of a development environment). At step 348, when the user of the computing device (e.g., user computing device 130), stops interacting with the function (e.g., the user or developer is no longer actively focusing on the function, or the function is no longer viewable within a window of a development environment), codebase effort tracking computing platform 110 may stop tracking the time spent in the function.

Since different programming languages may organize and structure code differently, tracking time at granular levels (e.g., at a file level, at a class level, at a function level, and/or at additional levels), as discussed in detail above, may generate meaningful and useful metrics. For example, some programming languages organize classes by separate files whereas other programming languages may contain multiple classes within a single file. Additionally, a class may include many functions and there may be a subset of class functions that are consuming inordinate amounts of developer time. As a result, it is advantageous to track codebase effort at the granular file level, class level, and function level. Additionally, in some embodiments, the time tracked at the file level is not automatically the sum of the time spent on a particular class or function (e.g., due to partial classes that might be spread across multiple files).

Figure 2E:
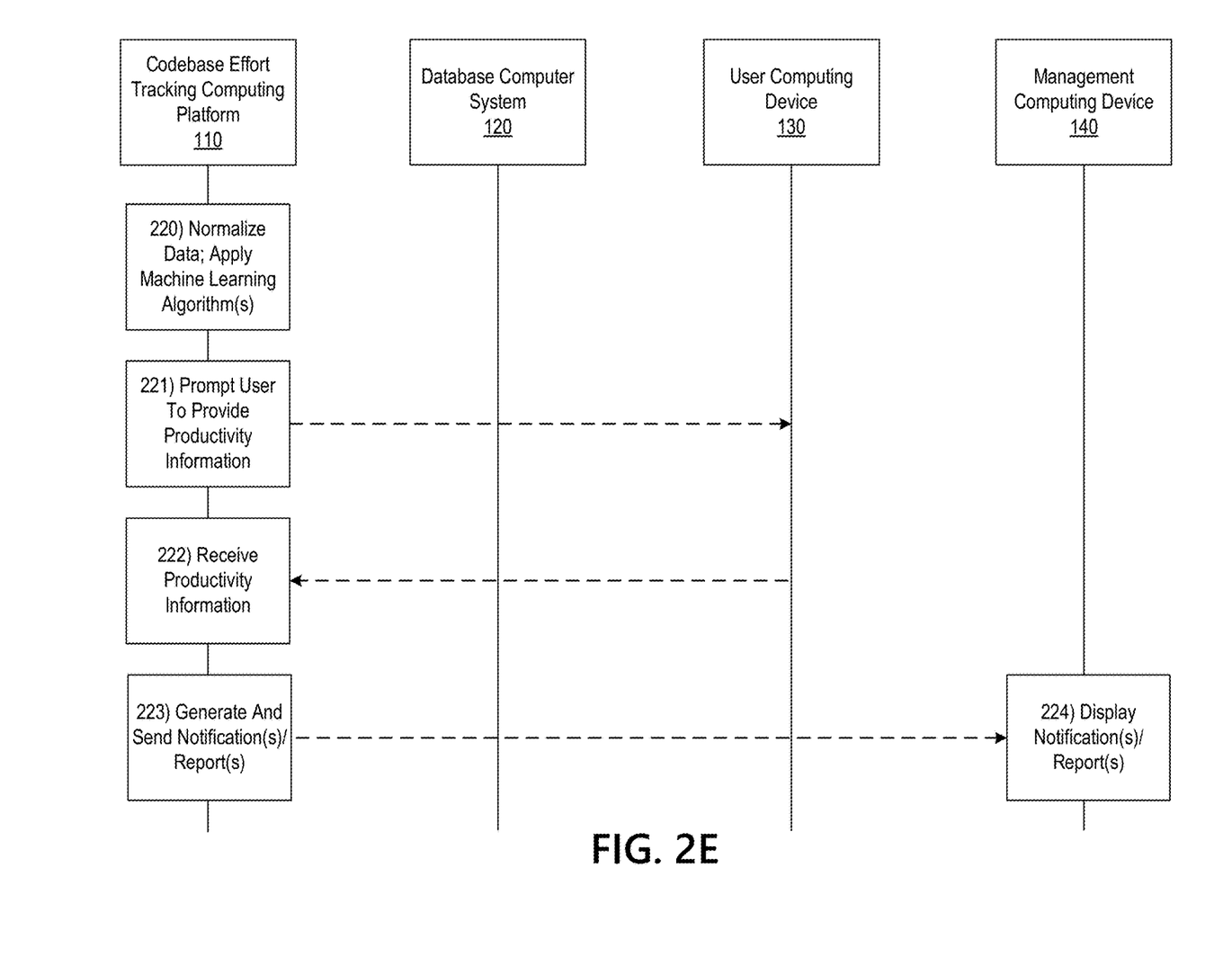

Referring to FIG. 2E, at step 220, in some embodiments, codebase effort tracking computing platform 110 may perform data normalization and/or machine learning operations. In some examples, codebase effort tracking computing platform 110 may associate or tag the code complexity metric with user identification information and/or timestamp information. Then, codebase effort tracking computing platform 110 may normalize the code complexity metric based on the user identification information or the timestamp information. Such user identification information may identify contributing users of the codebase (e.g., developers contributing to the codebase, including the user of the computing device 130). Such timestamp information may correspond to respective tracked interaction times (e.g., times at which a time metric is collected).

In some examples, codebase effort tracking computing platform 110 may apply a machine learning algorithm (e.g., a supervised learning algorithm) to the code complexity metric to identify one or more problematic areas of the codebase and initiate remedial action of the one or more problematic areas of the codebase. For instance, initiating the remedial action of the one or more problematic areas of the codebase may include providing a notification of the one or more problematic areas of the codebase to a management computing device (e.g., management computing device 140). For instance, applying the machine learning algorithm to the code complexity metric to identify the one or more problematic areas of the codebase may include identifying a technical debt area of the codebase (e.g., areas of code where shortcuts may have been taken during development of a software project in order to meet a deliverable) or a resource constrained area of the codebase (e.g., areas of code needing additional developers and/or developers with specific skillsets).

In some examples, codebase effort tracking computing platform 110 may apply an unsupervised clustering algorithm to the code complexity metric to generate clusters of data associated with contributing users of the codebase. Based on the generated clusters of data, codebase effort tracking computing platform 110 may identify insight information about the contributing users of the codebase and generate a report based on the insight information. For instance, identifying the insight information comprises identifying (e.g., flagging) training or coaching opportunities for the contributing users of the codebase, or identifying skillset mismatches associated with tasks assigned to the contributing users of the codebase. In some examples, codebase effort tracking computing platform 110 may use the clustering information to identify individual developers belonging to a cluster of slow-performing developers. In some examples, codebase effort tracking computing platform 110 may use the clustering information to identify developers with skillsets that do not match the needs of a software development project (e.g., web developers assigned to a project that is primarily a database system).

Figure 4:
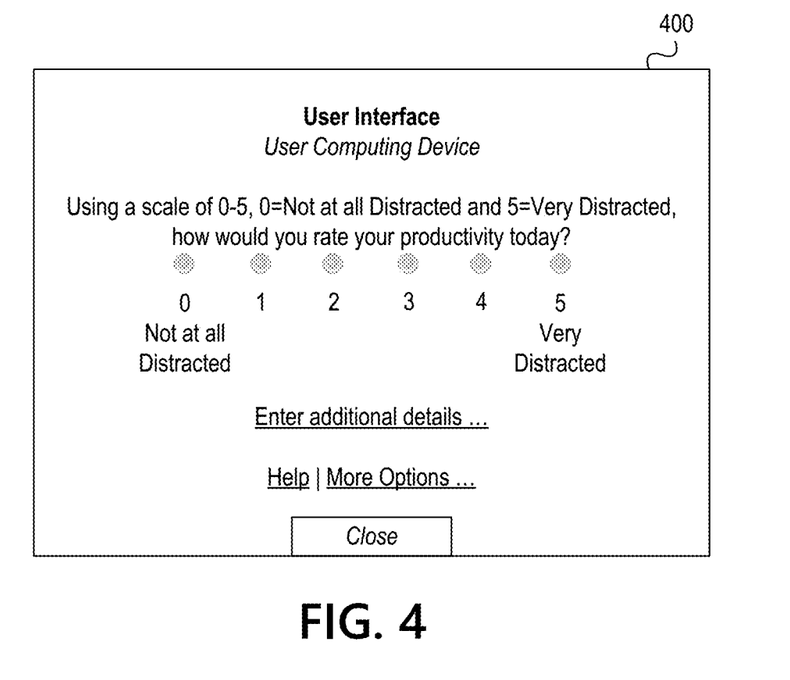
FIGS. 4 and 5 depict example graphical user interfaces for codebase effort tracking in accordance with one or more example embodiments.

At step 221, in some embodiments, codebase effort tracking computing platform 110 may prompt, via a communication interface (e.g., communication interface 113), the user of the computing device (e.g., user computing device 130) to provide productivity information indicating a level of productivity of the user of the computing device (e.g., user computing device 130) during a predetermined period of time. For example, in prompting the user of the computing device (e.g., user computing device 130) to provide productivity information, codebase effort tracking computing platform 110 may cause the user computing device (e.g., user computing device 130) to display and/or otherwise present one or more graphical user interfaces similar to graphical user interface 400, which is illustrated in FIG. 4. As seen in FIG. 4, graphical user interface 400 may include text and/or other information polling the user of the user computing device (e.g., user computing device 130) to provide a distraction response (e.g., "Using a scale of 0-5, 0=Not at all Distracted and 5=Very Distracted, how would you rate your productivity today? [0 . . . ] [1 . . . ] [2 . . . ] [3 . . . ] [4 . . . ] [5 . . . ]"). It will be appreciated that other and/or different notifications may also be provided.

Returning to FIG. 2E, at step 222, codebase effort tracking computing platform 110 may receive, via the communication interface (e.g., communication interface 113), the productivity information (e.g., developer-provided distraction response) from the user of the computing device (e.g., user computing device 130). In addition, codebase effort tracking computing platform 110 may normalize the code complexity metric based on the productivity information provided by the user of the computing device (e.g., user computing device 130).

Figure 5:
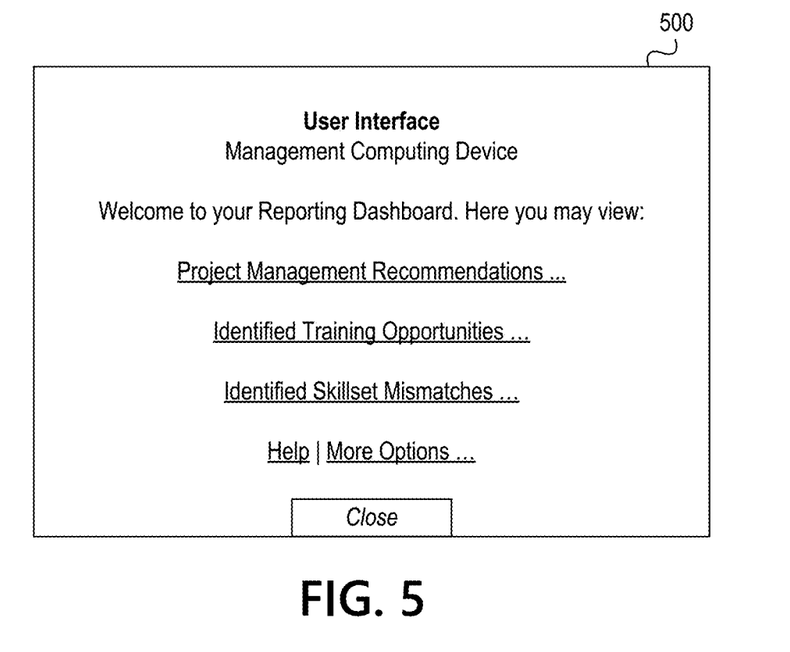

At step 223, codebase effort tracking computing platform 110 may generate and send, via a communication interface (e.g., communication interface 113), reports or notifications (e.g., an information reporting dashboard) to a user of management computing device 140 or another user of a user computing device that provide a comprehensive and accurate understanding of code complexity for a software development project. At step 224, codebase effort tracking computing platform 110 may cause the management computing device 140 to display and/or otherwise present the reports or notifications. For example, in generating a report or a notification, codebase effort tracking computing platform 110 may cause the management computing device (e.g., management computing device 140) or other user computing device to display and/or otherwise present one or more graphical user interfaces similar to graphical user interface 500, which is illustrated in FIG. 5. As seen in FIG. 5, graphical user interface 500 may include text and/or other information providing the user of the management computing device (e.g., management computing device 140) with generated insight information about the contributing users (e.g., developers) of the codebase (e.g., "Welcome to your Reporting Dashboard. Here you may view: [Project Management Recommendations . . . ] [Identified Training Opportunities . . . ] [Identified Skillset Mismatches . . . ]"). It will be appreciated that other and/or different notifications may also be provided.

Figure 6:
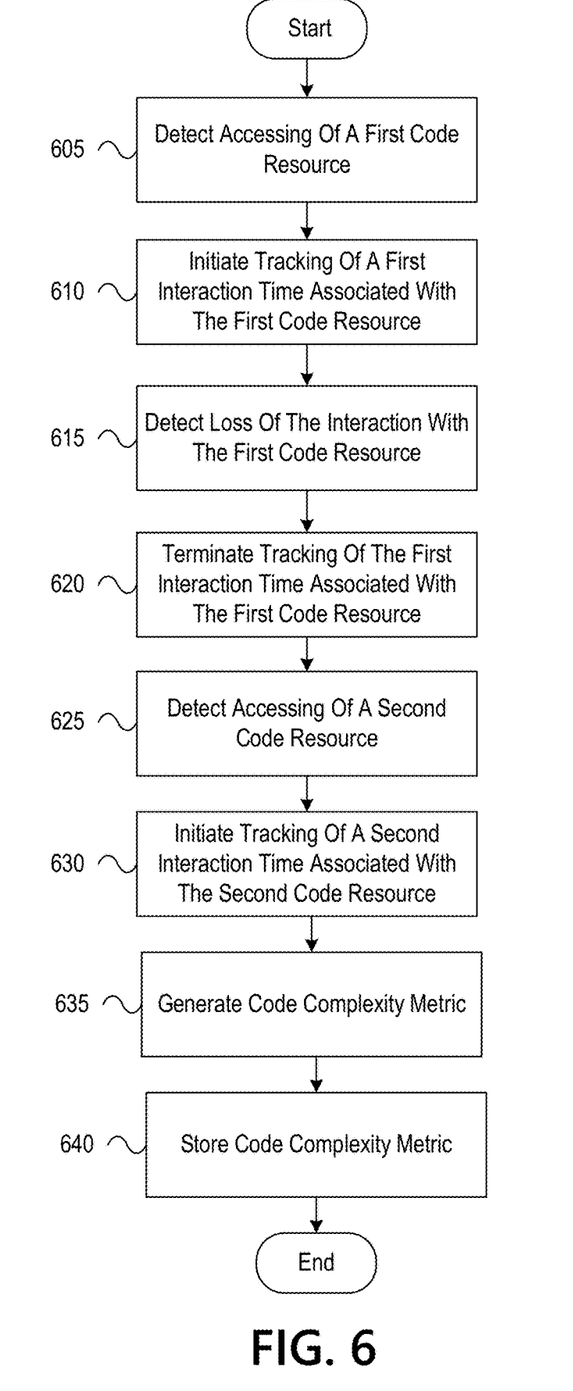
FIG. 6 depicts an illustrative method for codebase effort tracking in accordance with one or more example embodiments.

FIG. 6 depicts an illustrative method for codebase effort tracking in accordance with one or more example embodiments. Referring to FIG. 6, at step 605, a computing platform having at least one processor, a communication interface, and memory may detect accessing of a first code resource of a codebase by a user of a computing device. At step 610, responsive to detecting the accessing of the first code resource, the computing platform may initiate tracking of a first interaction time indicative of a time of an interaction by the user of the computing device with the first code resource. At step 615, the computing platform may detect loss of the interaction by the user of the computing device with the first code resource. At step 620, responsive to detecting the loss of the interaction with the first code resource, the computing platform may terminate tracking of the first interaction time associated with the first code resource. At step 625, the computing platform may detect accessing of a second code resource of the codebase by the user of the computing device. At step 630, responsive to detecting the accessing of the second code resource, the computing platform may initiate tracking of a second interaction time indicative of a time of an interaction by the user of the computing device with the second code resource. At step 635, based on the tracking of the first interaction time and the second interaction time, the computing platform may generate a code complexity metric indicative of a complexity of the codebase. At step 640, the computing platform may store the code complexity metric in at least one database.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   detect accessing of a first code resource of a codebase by a user of a computing device;
   responsive to detecting the accessing of the first code resource, initiate tracking of a first interaction time indicative of a time of an interaction by the user of the computing device with the first code resource;
   detect loss of the interaction by the user of the computing device with the first code resource;
   responsive to detecting the loss of the interaction with the first code resource, terminate tracking of the first interaction time associated with the first code resource;
   detect accessing of a second code resource of the codebase by the user of the computing device;
   responsive to detecting the accessing of the second code resource, initiate tracking of a second interaction time indicative of a time of an interaction by the user of the computing device with the second code resource;

based on the tracking of the first interaction time and the second interaction time, generate a code complexity metric indicative of a complexity of the codebase; and store the code complexity metric in at least one database.

2. The computing platform of claim 1, wherein the memory stores additional computer-readable instructions that, when executed by the at least one processor, cause the computing platform to:

detect loss of the interaction by the user of the computing device with the second code resource; and responsive to detecting the loss of the interaction with the second code resource, terminate tracking of the second interaction time associated with the second code resource.

3. The computing platform of claim 2, wherein the memory stores additional computer-readable instructions that, when executed by the at least one processor, cause the computing platform to:

detect accessing of a third code resource of the codebase by the user of the computing device;

responsive to detecting the accessing of the third code resource, initiate tracking of a third interaction time indicative of a time of an interaction by the user of the computing device with the third code resource; and update the code complexity metric based on the third interaction time associated with the third code resource.

4. The computing platform of claim 3, wherein the first code resource, the second code resource, and the third code resource comprise different code resources.

5. The computing platform of claim 1, wherein detecting accessing of a respective code resource comprises detecting accessing of a file, a class, or a function.

6. The computing platform of claim 1, wherein detecting loss of an interaction with a respective code resource comprises detecting an expiration of a predetermined duration of time after which accessing of the respective code resource is detected.

7. The computing platform of claim 1, wherein the memory stores additional computer-readable instructions that, when executed by the at least one processor, cause the computing platform to:

associate the code complexity metric with user identification information;

associate the code complexity metric with timestamp information; and normalize the code complexity metric based on the user identification information or the timestamp information.

8. The computing platform of claim 1, wherein the memory stores additional computer-readable instructions that, when executed by the at least one processor, cause the computing platform to:

determine that the user of the computing device is interacting with a respective code resource based on tracking a cursor on a viewport of the computing device, tracking a keyboard input on the viewport of the computing device, tracking facial movements of the user of the computing device, or tracking processor activity on the computing device.

9. The computing platform of claim 1, wherein the memory stores additional computer-readable instructions that, when executed by the at least one processor, cause the computing platform to:

apply a machine learning algorithm to the code complexity metric to identify one or more problematic areas of the codebase; and initiate remedial action of the one or more problematic areas of the codebase.

10. The computing platform of claim 9, wherein initiating the remedial action of the one or more problematic areas of the codebase comprises sending a notification of the one or more problematic areas of the codebase to a management computing device.

11. The computing platform of claim 9, wherein applying the machine learning algorithm to the code complexity metric to identify the one or more problematic areas of the codebase comprises identifying a technical debt area of the codebase or a resource constrained area of the codebase.

12. The computing platform of claim 1, wherein the memory stores additional computer-readable instructions that, when executed by the at least one processor, cause the computing platform to:

apply an unsupervised clustering algorithm to the code complexity metric to generate clusters of data associated with contributing users of the codebase;

based on the generated clusters of data, identify insight information about the contributing users of the codebase; and generate a report based on the insight information.

13. The computing platform of claim 12, wherein identifying the insight information comprises identifying training opportunities for the contributing users of the codebase or skillset mismatches associated with tasks assigned to the contributing users of the codebase.

14. The computing platform of claim 1, wherein the memory stores additional computer-readable instructions that, when executed by the at least one processor, cause the computing platform to:

prompt the user of the computing device to provide productivity information indicating a level of productivity of the user of the computing device during a predetermined period of time; and normalize the code complexity metric based on the productivity information provided by the user of the computing device.

15. A method, comprising:

at a computing platform comprising at least one processor, a communication interface, and memory:

detecting, by the at least one processor, accessing of a first code resource of a codebase by a user of a computing device;

responsive to detecting the accessing of the first code resource, initiate, by the at least one processor, tracking of a first interaction time indicative of a time of an interaction by the user of the computing device with the first code resource;

detecting, by the at least one processor, loss of the interaction by the user of the computing device with the first code resource;

responsive to detecting the loss of the interaction with the first code resource, terminating, by the at least one processor, tracking of the first interaction time associated with the first code resource;

detecting, by the at least one processor, accessing of a second code resource of the codebase by the user of the computing device;

responsive to detecting the accessing of the second code resource, initiating, by the at least one processor, tracking of a second interaction time indicative of a time of an interaction by the user of the computing device with the second code resource;

based on the tracking of the first interaction time and the second interaction time, generating, by the at least one processor, a code complexity metric indicative of a complexity of the codebase; and storing, by the at least one processor, the code complexity metric in at least one database.

16. The method of claim 15, further comprising:

detecting, by the at least one processor, loss of the interaction by the user of the computing device with the second code resource; and responsive to detecting the loss of the interaction with the second code resource, terminating, by the at least one processor, tracking of the second interaction time associated with the first code resource.

17. The method of claim 16, further comprising:

detecting, by the at least one processor, accessing of a third code resource of the codebase by the user of the computing device;

responsive to detecting the accessing of the third code resource, initiating, by the at least one processor, tracking of a third interaction time indicative of a time of an interaction by the user of the computing device with the third code resource; and updating, by the at least one processor, the code complexity metric based on the third interaction time associated with the third code resource.

18. The method of claim 17, wherein the first code resource, the second code resource, and the third code resource comprise different code resources.

19. The method of claim 16, wherein detecting accessing of a respective code resource comprises detecting accessing of a file, a class, or a function.

20. One or more non-transitory computer-readable media storing instructions that, when executed by a computing platform comprising at least one processor, a communication interface, and memory, cause the computing platform to:

detect accessing of a first code resource of a codebase by a user of a computing device;

responsive to detecting the accessing of the first code resource, initiate tracking of a first interaction time indicative of a time of an interaction by the user of the computing device with the first code resource;

detect loss of the interaction by the user of the computing device with the first code resource;

responsive to detecting the loss of the interaction with the first code resource, terminate tracking of the first interaction time associated with the first code resource;

detect accessing of a second code resource of the codebase by the user of the computing device;

responsive to detecting the accessing of the second code resource, initiate tracking of a second interaction time indicative of a time of an interaction by the user of the computing device with the second code resource;

based on the tracking of the first interaction time and the second interaction time, generate a code complexity metric indicative of a complexity of the codebase; and store the code complexity metric in at least one database.

* * * * *